United States Patent
Monga

(10) Patent No.: US 7,844,116 B2
(45) Date of Patent: Nov. 30, 2010

(54) METHOD FOR IDENTIFYING IMAGES AFTER CROPPING

(75) Inventor: Vishal Monga, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 883 days.

(21) Appl. No.: 11/742,020

(22) Filed: Apr. 30, 2007

(65) Prior Publication Data

US 2008/0267519 A1 Oct. 30, 2008

(51) Int. Cl.
G06K 9/00 (2006.01)
G06K 9/46 (2006.01)
G06K 9/66 (2006.01)
G06K 9/36 (2006.01)

(52) U.S. Cl. .................... 382/190; 382/181; 382/276; 382/280

(58) Field of Classification Search ................ 382/190, 382/181, 276, 280
See application file for complete search history.

(56) References Cited

U.S. PATENT DOCUMENTS

2004/0258243 A1* 12/2004 Shin et al. ................... 380/210

OTHER PUBLICATIONS

Mihcak, M.—"Robust image hashing via non-negative matrix factorizations"—ICASSP IEEE, May 14-19 2006, pp. 225-228.*
Uhle et al—"Ambience Separation from Mono Recordings"—AES 30th International Conference, Mar. 15-17 2007, pp. 139-145.*
Coskun, B.—"Spatio-Temporal Transform Based Video Hashing"—IEEE—Dec. 2006, pp. 1190-1208.*
U.S. Appl. No. 11/851,774 to V. Monga, filed on Sep. 7, 2007.

* cited by examiner

Primary Examiner—Bhavesh M Mehta
Assistant Examiner—Bernard Krasnic
(74) Attorney, Agent, or Firm—Oliff & Berridge, PLC

(57) ABSTRACT

Images within an image repository related to a selected image may be located despite cropping, rotating, and/or the application of a variety of other distortions to either the selected image and/or images in the image repository. Described exemplary approaches may use image digests produced using a multi-step process. In a first step, a discrete Fourier transform may be applied to produce an M×N frequency-based image matrix from an M×N image matrix containing elements that represent spatial image pixel values. In subsequent steps, matrix approximations may be applied to reduce the M×N frequency-based image matrix and to produce an image digest that reflects the content of the image. Further, an approach is described for generating a search threshold value that may be used to determine whether images digests associated with images in a repository are sufficiently similar to a search digest to be returned in a search result.

10 Claims, 14 Drawing Sheets

METHOD FOR IDENTIFYING IMAGES AFTER CROPPING

BACKGROUND

This disclosure relates to the generation and use of image digests to locate images with matching image content.

Due to the popularity of digital technology, more and more digital images are being created and stored every day. The increasing volume of digital images being produced introduces problems for managing image repositories. For example, a user cannot determine if an image already exists in an image repository without exhaustively searching through all the existing images stored in the image repository. Further complication may arise from the fact that two images that appear identical to the human eye may have different digital representations, e.g. an original image and its compressed version, an image stored using distinct transforms, or an image enhanced via common signal processing operations, thus making it difficult to use automated methods to locate matching images.

Further, some copies of an original image may have been cropped, compressed, resized and/or enhanced. Other copies may have been rotated, or may have been generated with modified control parameters, such as a higher or lower contrast ratio setting than were used to generate the original image. Further, content items within the images may have been manually or electronically edited to add or remove small features within the photograph.

Generally, stored images may go through several distortions and these distorted versions may be either archived in image repositories or made available as query images for use in locating an original or otherwise related image. Recent research in image hashes/digests has addressed this problem to some extent. An image digest is simply a function of the image content that evaluates to a vector that is relatively short, as compared with the image size. For example, see M. Schneider and S. F. Chang, "A robust content based digital signature for image authentication," *Proc. IEEE Conf. on Image Processing*, vol. 3, pp. 227-230, September 1996; R. Venkatesan, S. M. Koon, M. H. Jakubowski, and P. Moulin, "Robust Image Hashing," *Proc. IEEE Conf. on Image Processing*, pp. 664-666, September 2000; and V. Monga and B. L. Evans, "Robust Perceptual Image Hashing Using Feature Points," *Proc. IEEE Conf. on Image Processing*, 2004.

Previous research has focused on the creation of image digests that are robust under common signal and image processing operations, while geometric distortions such as the cropping of an image, translation of image pixels etc. have not been addressed. Creating an image digest using traditional cryptographic or repository hashes poses a problem in that such image digests are sensitive to very small changes to the image data. For example, current image digests that result from perceptually similar images may not be sufficiently similar for use in identifying the images as perceptually similar.

Such approaches are not able to accommodate cropping and pixel translations, such as rotation. Further, cropping and pixel translation are quite common in typical repository images. For example, consider many shots of the same scene taken by a physically moving the camera and/or by adjusting the focal length, i.e. zoom factor. In addition, printing and scanning often may involve mild rotation and significant cropping of the image.

SUMMARY

Hence, a need remains for an ability to search an image repository containing a large number of images to identify distorted versions of an identified search image. Preferably, such an image search approach would be able to identify related images quickly, with few misses and a low number of falsely identified images.

The described image digest based search approach allows images within an image repository that are related to a selected image to be located despite cropping, rotating, and/or the application of a variety of other distortions. In particular, the approach extracts an image digest such that the image digests obtained from an original image and its distorted version are close in some notion of distance defined on the image digests. At the same time, the image digest successfully discriminates between altogether different images, i.e. a large separation distance is exhibited between corresponding image digests of perceptually distinct images.

In exemplary embodiments, a cascade algorithm may be used that first transforms a spatial image into the Fourier domain and then retains significant Fourier coefficients. Next, a dimensionality reduction may be obtained using Non-Negative Matrix Approximation (NNMA) processing that supports appropriate distance measures, as addressed in greater detail below.

Use of the Fourier domain contributes to the robustness of a search despite cropping. In particular, in the spatial or native pixel domain of an image, cropping is equivalent to completely removing some part of the image while retaining the rest in an "untouched" manner. However, in the Fourier (or frequency) domain, cropping is manifested as a distortion or noise applied to the Fourier spectra of the image. This noise can be mitigated by dimensionality reduction techniques such as the non-negative matrix approximations described below.

The described approach achieves robustness of up to 25-30% cropping and even up to 10-15 degrees of rotation. Experimental results of over one-hundred images in an image repository demonstrate the success of the described approach for use in searching for original images using their cropped versions while avoiding misclassification. The approach may be readily applied using the described two-step cascade structure in which Fourier transforms are applied in a first step and particular matrix approximations are applied in the second step.

The described approach generates NNMA image digests that exhibit robustness to cropping and a wide range of other distortions. The approach may treat images or rasterized pixels as matrices and may identify low-rank matrix approximation vectors that naturally exhibit robustness to geometric distortions, e.g., cropping, pixel translation, etc. The approach generates subspace projections of images using these matrix approximations such that projections from perceptually similar images map to vectors that are close in some notion of distance.

The approach uses non-negative matrix approximations that provide optimal low-rank approximations to a matrix under a wide class of distance functions known as Bregman divergences. For example, see I. S. Dhillon and S. Sra, "Generalized Non-negative Matrix Approximations with Bregman Divergences," *UTCS Technical Report #TR-xx*-05, June 2005.

The non-negativity constraint in NNMAs means that matrices B and C used to approximate the original image matrix capture local image features, unlike standard rank-reduction techniques like SVD and PCA which are holistic in nature. This in turn means that image digests based on such approximations can better discriminate between visually distinct images. See D. D. Lee and H. S. Seung, "Algorithms for Nonnegative Matrix Factorization," *NIPS*, pages 556-562, 2000.

Further, NNMAs are available under a whole class of distance measures that may be referred to as "Bregman divergences." This again contrasts with traditional techniques where the approximation is always under the squared distance measure or the Frobenius matrix norm. As described in greater detail below, the choice of the distance measure under which NNMAs are obtained significantly affects robustness to particular distortions. See Y. Censor and S. A. Zenios, "Parallel Optimization: Theory, Algorithms, and Applications, Numerical Mathematics and Scientific Computation," *Oxford University Press*, 1997.

In addition, the approach may model the effect of cropping of an image as a convolution with a sinc function in the frequency domain. The approach first retains significant discrete Fourier transform (DFT) coefficients to create a modified image and subsequently may perform low-rank NNMAs on the modified image to obtain the final NNMA image digest.

Experiments reveal that the NNMA image digests can enable identification of original images even after 25-30% cropping and with little or no misclassification.

BRIEF DESCRIPTION OF THE DRAWINGS

Exemplary embodiments will be described with reference to the accompanying drawings, wherein like numerals represent like parts, and in which.

DETAILED DESCRIPTION OF EMBODIMENTS

Figure 1:
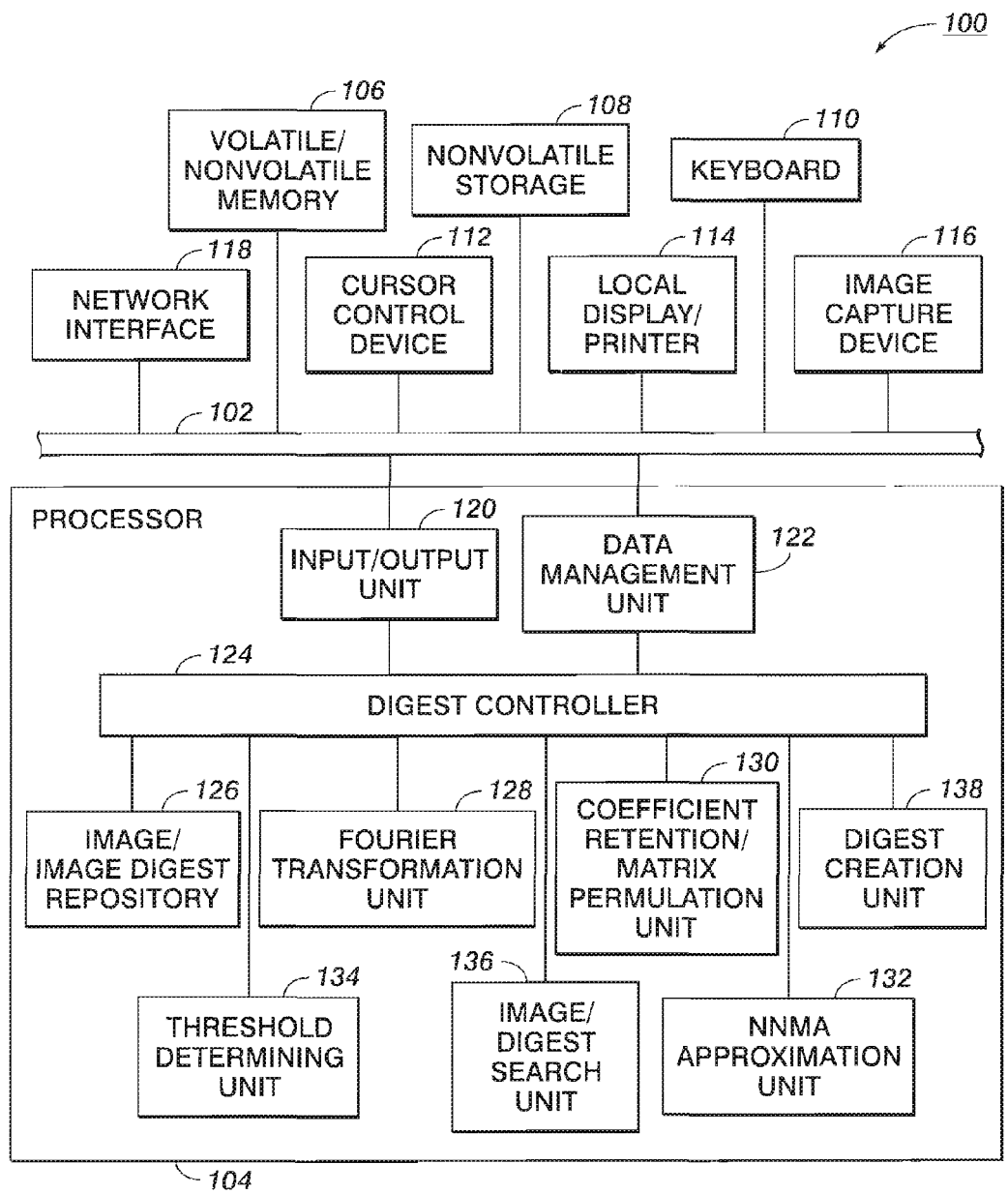
FIG. 1 is a system level block diagram of an exemplary NNMA image digest processing device.

FIG. 1 is a system level block diagram of an exemplary NNMA image digest processing device 100. An NNMA image digest processing device 100, as shown in FIG. 1, may include, a computer system data bus 102 that allows a processor 104 to communicate and exchange information with hardware components of the device such as: volatile/nonvolatile memory 106, which allows the processor 104 to store program instructions in local memory for execution and to store and maintain temporary variables necessary for execution of the stored program instructions; nonvolatile storage 108, which allows processor 104 to access and retrieve larger bodies of data and program instructions for later execution by the processor; keyboard 110, and/or a cursor control device 112 that allows the processor to receive user instructions and/or information and/or feedback; network interface 118 which allows processor 104 to communicate and exchange information with other devices over a LAN/WAN/Internet network as described below; an image capture device 116 which may be used to generate digital images from hardcopy versions of an image; and display/printer 114 which allows processor 104 to format and present feedback and reports to an operator of NNMA image digest processing device 100.

As further shown in FIG. 1, processor 104 may include internal components which allow the processor to communicate with the above-described hardware components to send and receive data and instructions over system bus 102. Such components may include: a digest controller 124 capable of communicating with and controlling an input/output unit 120 that manages communication exchanges with the system bus 102; and a data management unit 122, which allows the controller to maintain a local set of control parameters such as counters, pointers, and segments of executable program instructions currently under execution.

When provided with executable instructions, digest controller 124 may, in addition to performing other functions and in accordance with instructions/commands received from a user, retrieve and initiate control parameters/pointers for the execution of program instructions related to receiving an image; maintaining an image/NNMA image digest repository; generating a new NNMA image digest; generating threshold search parameters for use in searching an image repository based on a created/identified NNMA image digest; and to conduct a search and report search results based on a created/identified NNMA image digest.

Therefore, at startup, as described above, digest controller 124 may retrieve and load program instructions from nonvolatile storage 108 into volatile/nonvolatile memory 106 for execution and may maintain control parameters in data management unit 122 for use in controlling the simultaneous and/or sequential execution of the program instructions retrieved for execution. In this manner, processor 104 may establish, based on stored program instructions retrieved for execution from nonvolatile storage 108, such as a hard-drive and/or firmware storage: (1) an image/NNMA image digest repository 126 that may be used to store a repository of digital images and NNMA image digests associated with each digital image, as described in greater detail below; (2) a Fourier transformation unit 128 that receives a digital image represented as an M×N 2-dimensional matrix of spatial image pixel values and that applies a 2-dimensional matrix Fourier transformation to produce an M×N 2-dimentional matrix of coefficients of a frequency-based representation of the image; (3) a Fourier coefficient retention and matrix permutation unit 130 that selectively excludes, e.g., sets to zero, coefficients of the M×N 2-dimentional frequency-based representation of an image and then applies matrix permutations to produce a matrix $I_F$ of size P×Q; (4) an NNMA approximation unit 132 that produces a rank matrix approximation of $I_F$ that includes a matrix $B_{P \times r} \times C_{r \times Q}$; (5) a digest creation unit 138 that generates an NNMA image digest based on the generated matrix approximations $B_{P \times r}$ and $C_{r \times Q}$; (6) a threshold determining unit 134 that assesses NNMA image digests associated with images in an image repository to determine a threshold that may be used to determine whether two images within the image repository are related or unrelated based on a comparison of their respective NNMA image digests; and (7) an image search unit 136 that may be used to search one or more image repositories based on an NNMA image digest of a search image of interest and a search threshold value, to locate images within the one or more image repositories that are related, i.e., identical to, or modified or distorted variations of the search image.

Figure 2:
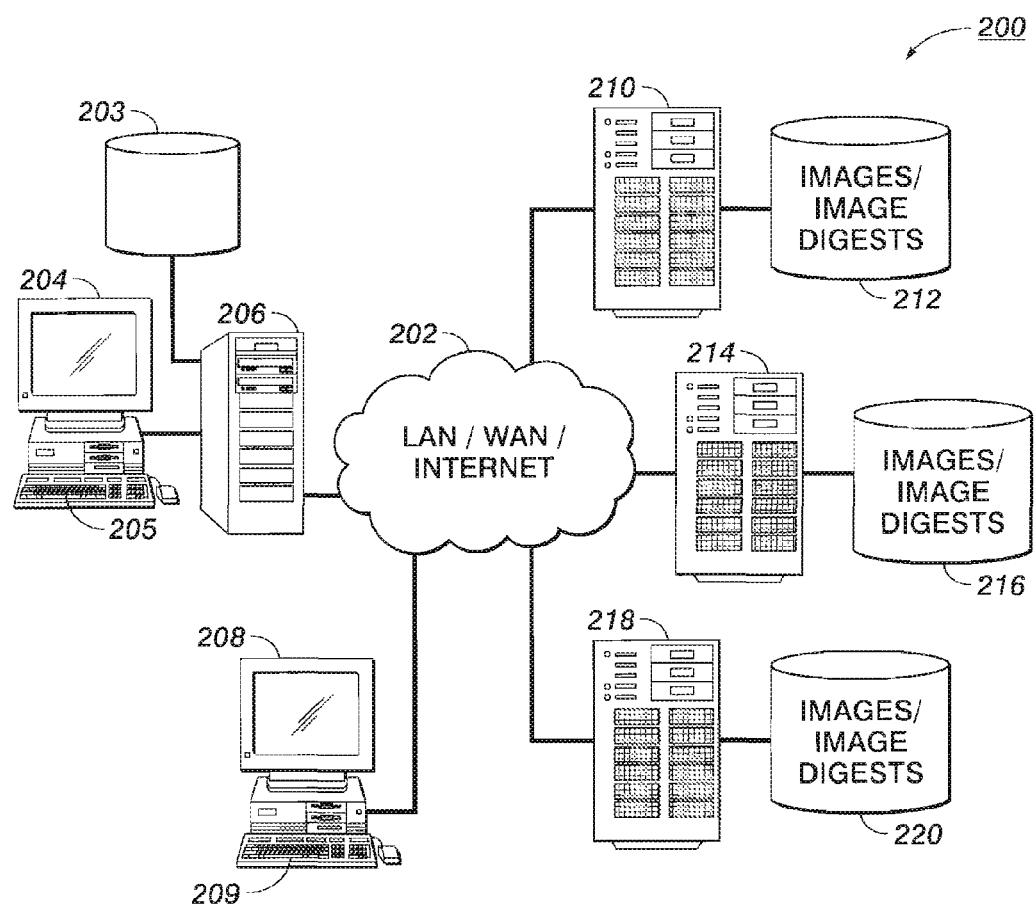
FIG. 2 is a schematic diagram of an exemplary network that provides connectivity between an exemplary NNMA image digest processing device configured as a user workstation and a plurality of NNMA image digest processing devices configured as image repository servers.

FIG. 2 is a schematic diagram of an exemplary network 200 that provides connectivity between an exemplary NNMA image digest processing device configured as a stand-alone user workstation with a local image/image repository, a plurality of NNMA image digest processing devices configured as image repository servers, and a remote client workstation. For example, wide area and/or internet based network 202 may provide connectivity between a stand-alone digest processing device 206, with local image/NNMA image digest repository 203, configured as a standalone workstation with display 204 and keyboard 205, a remote client workstation with a display device 208, processor and keyboard 209, and one or more second digest processing devices configured as NNMA image digest based search repository servers that support remote requests for conducting NNMA image digest based searching.

For example, as shown in FIG. 2, image repository server 210 with image/NNMA image digest repository 212, image repository server 214 with image/NNMA image digest repository 216, and image repository server 218 with image/NNMA image digest repository 220 may each service requests for searches from either stand-alone digest processing device 206 with local image/NNMA image digest repository 203, or from a client workstation 208, as described below with respect to FIG. 4.

For example, stand-alone digest processing device 206 with local image/NNMA image digest repository 203 may allow a user to generate NNMA image digests, establish thresholds based on the content of local image/NNMA image digest repository 203, and to execute searches against the local image/NNMA image digest repository 203. Further, stand-alone digest processing device 206 may submit an image search request that identifies a digital image and/or NNMA image digest to one or more remote image repository servers to initiate a search for related images stored in the remote image repositories maintained by the respective remote image repository servers. Further, a client workstation 208, that does not support one or more of the features described above with respect to FIG. 1, may also initiate a search request. For example, a client workstation may access an image repository server to browse images on the server. When the user sees an image that the user desires, the user may select an option for the server to search for and return images related to the selected image. In each of the embodiments described above, a user may also submit a digital image produced by scanning a hardcopy image and initiating a search to locate related images based on the scanned digital image.

Figure 3:
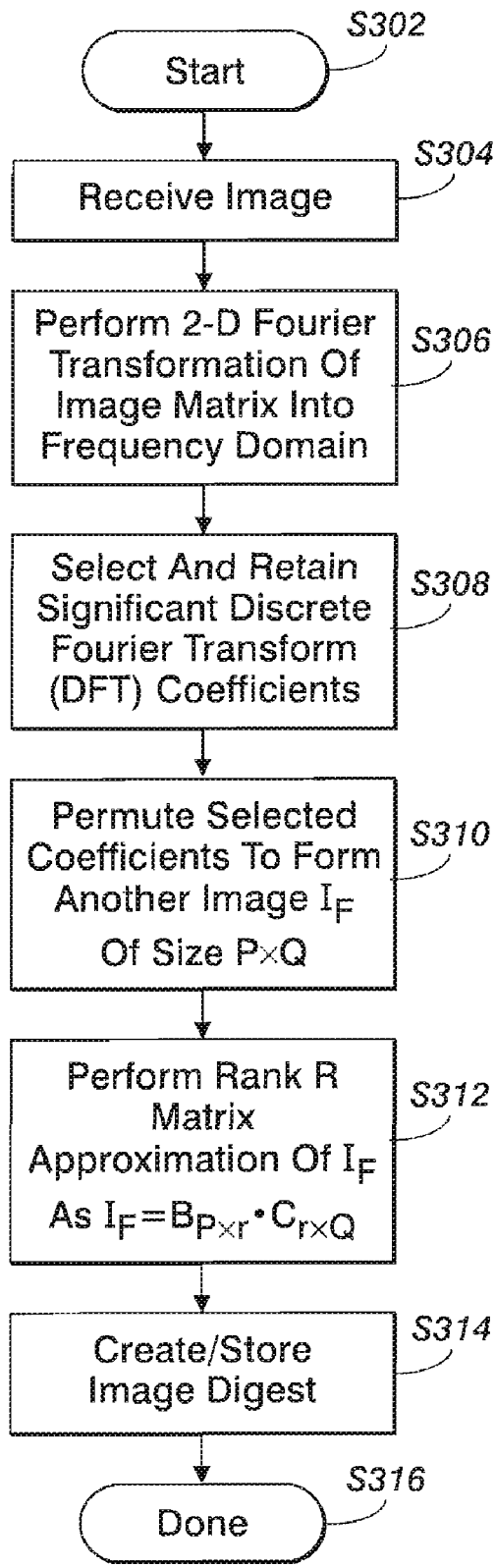
FIG. 3 is a flow diagram representing an exemplary method for generating an NNMA image digest.

FIG. 3 is a flow diagram representing an exemplary method for generating an NNMA image digest. As shown in FIG. 3, operation of the method begins at step S302 and proceeds to step S304.

In step S304, an exemplary NNMA image digest processing device may receive a digital image represented as a 2-dimensional M×N matrix with M rows and N columns, in which elements of the M×N image matrix represent spatial image pixel values. The digital image may be received as an electronic file over a network, received from a local permanent or temporary storage device, a local scan device, etc. Once the image is received, or otherwise identified, operation proceeds to steps 306.

In step S306, the exemplary NNMA image digest processing device performs a 2-dimensional transformation of the spatial image, as described in greater detail below, to produce from the spatial M×N 2-dimensional matrix, a frequency-based M×N 2-dimensional representation of the image and operation of the method continues to step S308.

In step S308, the exemplary NNMA image digest processing device selects and retains significant discrete Fourier transform coefficients of the M×N frequency-based 2-dimensional matrix, as described in greater detail below, and operation of the method continues to step S310.

In step S310, the exemplary NNMA image digest processing device performs matrix permutations of the remaining non-zero coefficients of the M×N frequency-based 2-dimensional matrix to produce a frequency base 2-dimensional matrix $I_F$ with P rows and Q columns, and operation of the method continues to step S312.

In step S312, a rank R matrix approximation of matrix $I_F$ is performed, as described in greater detail below, resulting in a single row matrix $B_{P \times r}$ and a singe column matrix $C_{r \times Q}$ such that $I_F$ may be closely approximated by the expression $I_F = B_{P \times r} C_{r \times Q}$, and operation of the method continues to step S314.

In step S314, an NNMA image digest is created based on the coefficients of single row matrix $B_{P \times r}$ and the coefficients of single column matrix $C_{r \times Q}$, e.g., by, for example, concatenation, and operation of the process terminates at step S316.

The above process may be used to generate multiple image digests for an image. For example, control parameters used in the steps described above, e.g., the range of the frequency coefficients and the rank r of the approximation, may be used to generate multiple image digests, each with a different robustness under cropping and/or fragility to visually distinct inputs.

Figure 4:
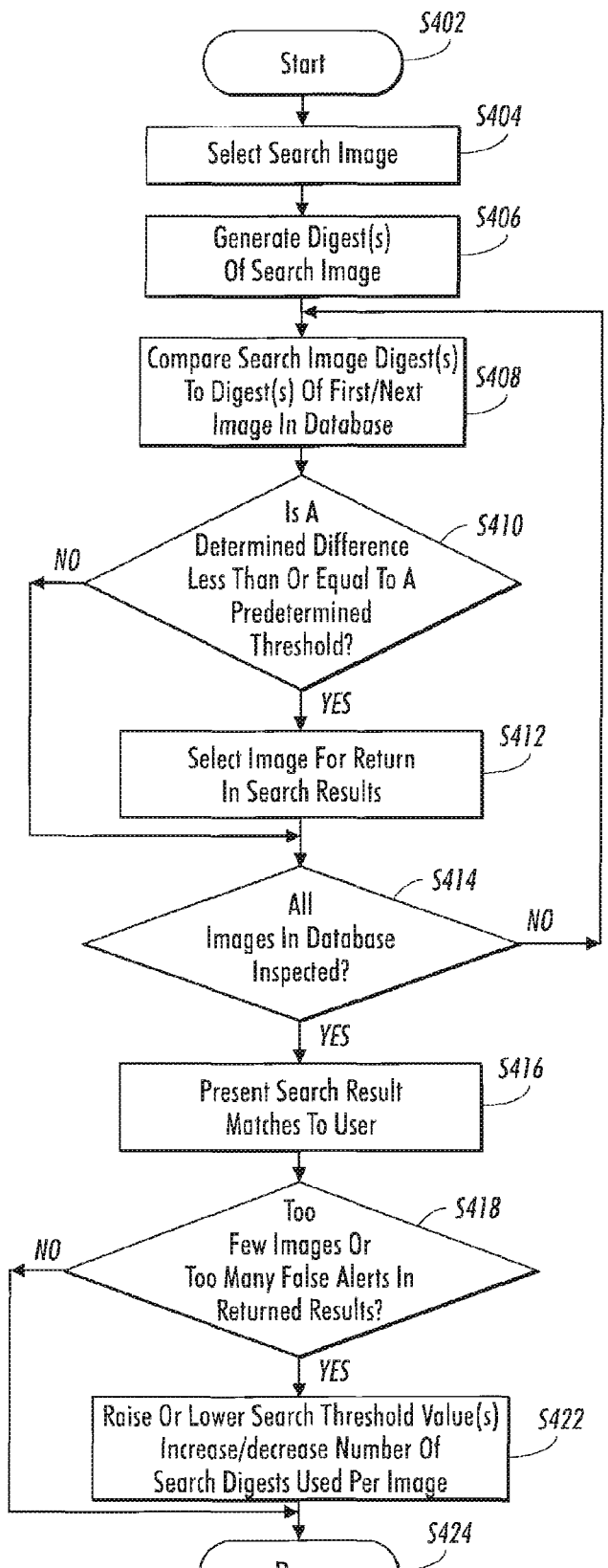
FIG. 4 is a flow diagram representing an exemplary method for conducting an NNMA image digest based search of an image repository.

FIG. 4 is a flow diagram representing an exemplary method for conducting an NNMA image digest based search of an image repository. As described below with respect to FIG. 4, a search for a related image based on a selected search image may be based on a comparison of one or more image digests associated with the selected search image with one or more corresponding image digests associated with each stored image.

As shown in FIG. 4, operation of the method begins at step S402 and proceeds to step S404.

In step S404, a search image may be selected based, for example, on a review of an image repository to be searched, a review of another local or remote image repository, or received via a network connection, or an imaging device such as a local or remote image scanner or camera, and operation proceeds to step S406.

In step S406, search digests, e.g., one or more NNMA image digests of the image for which related images are to be located, are generated and operation proceeds to step S408.

In step S408, the one or more generated search digests may be compared to one or more corresponding NNMA image digests associated with a next image in the repository being searched, and operation proceeds to step S410.

If, in step S410, a difference, e.g., a distance, between a search digest and a digest of the selected image in the image repository is greater that a predetermined threshold level, operation proceeds to step S414, otherwise operation proceeds to step S412.

In step S412, the selected image from the image repository is marked for inclusion in the search results, and operation proceeds to step S414.

If, in step S414, the one or more NNMA image digests associated with each image in the image repository being searched has been compared to the one or more search digests, operation proceeds to step S416, otherwise operation returns to step S408.

In step S416, a list or set of marked images, each selected in step S412 for inclusion in the search results, may be output to the user via a display device and/or printer, and operation proceeds to step S418.

If, in step S418, the user is satisfied with the number of images returned by the search and is satisfied with the number, if any, of false matches included in the search results, operation may proceed to step S424 and the process terminates, otherwise operation proceeds to step S422.

In step S422, the threshold may be raised to increase the number of images returned by a search, or lowered to reduce the possibility of false matches in subsequent digest based searches, and operation terminates at step S430. Further, the number of image digests used in the search maybe raised to increase the number of images returned by a search, or lowered to reduce the possibility of false matches in subsequent digest based searches. For example, if the number of images returned by a search is below a predetermined threshold for the number of images to be returned by a search, the digest processor may automatically increase the search threshold and may, if so configured, automatically re-execute the search. Further, if a user reports that a large number of unrelated images have been returned in the search results, the digest processor may decrease the search threshold in preparation for a subsequent search executed by the user. The effect of raising or lowering the search threshold is described in greater detail below.

Figure 5:
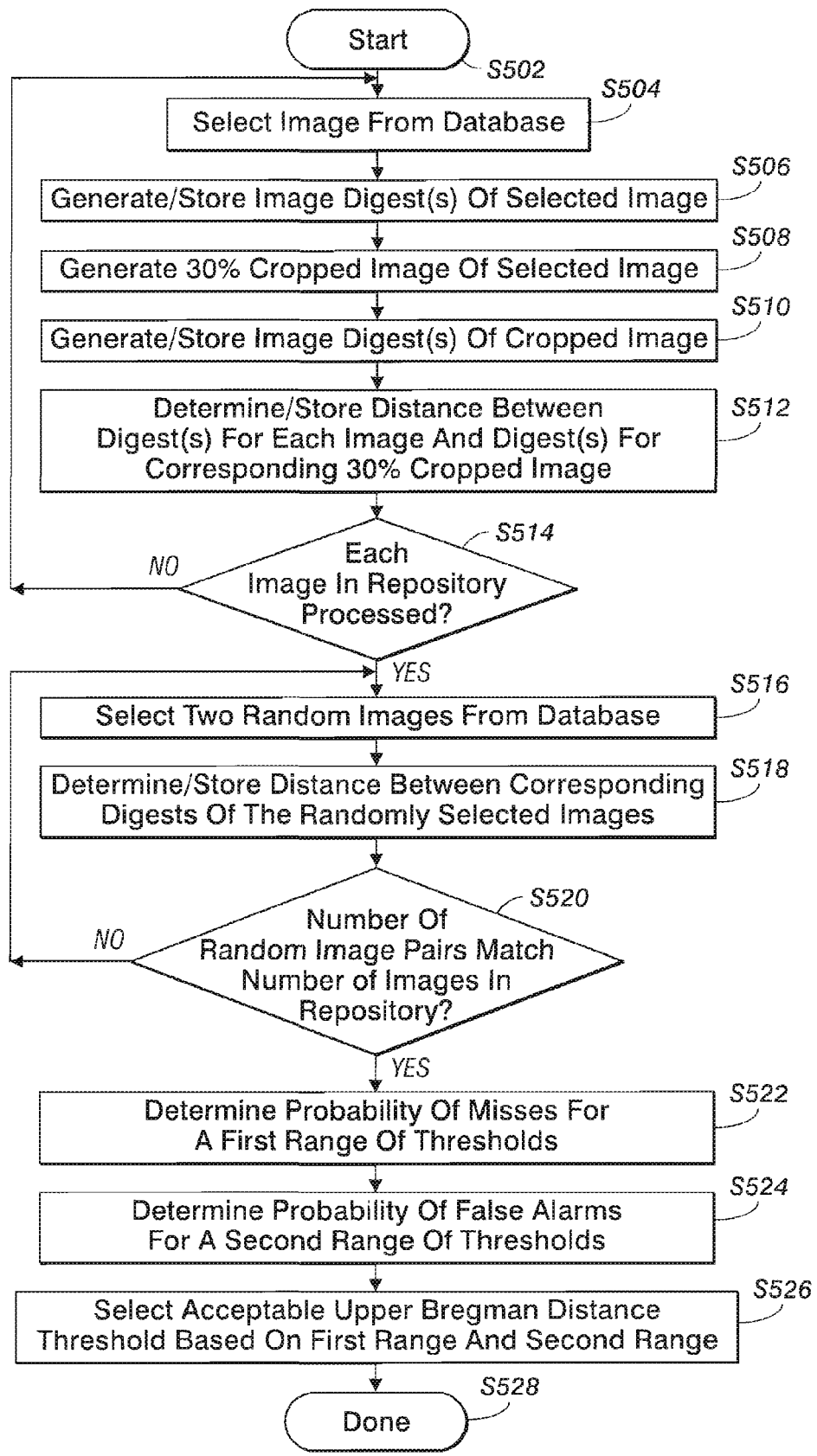
FIG. 5 is a flow diagram representing an exemplary method for determining a threshold value for use in conducting an NNMA image digest based search of an image repository.

FIG. 5 is a flow diagram representing an exemplary method for preparing an image repository for being searched using an NNMA image digest based search, as described above with respect to FIG. 4. As described below with respect to FIG. 5, one or more image digests may be generated for a single image. Each image digest may be generated using different algorithm parameters as addressed in greater detail below. Further, the method described in FIG. 5 may be used to determine an NNMA image digest threshold for use conducting an NNMA image digest based search of the image repository, as described above with respect to FIG. 4.

As shown in FIG. 5, operation of the method begins at step S502 and proceeds to step S504.

In step S504, a first, or next, image is selected from the image repository, and operation proceeds to step S506.

In step S506, one or more NNMA image digests may be generated and stored for the selected image, each image digest generated as described above with respect to FIG. 3, and operation proceeds to step S508.

In step S508, a 30% cropped image may be produced from the currently selected image, and operation proceeds to step S510.

In step S510, the one or more NNMA image digests may be generated, as described above with respect to FIG. 3, and stored for the 30% cropped image, and operation may proceed to step S512.

In step S512, a distance between each of the NNMA image digest vectors of the original image, generated in step 506, and each of the corresponding NNMA image digest vectors of the 30% cropped image, generated in step 510, is determined and stored, as addressed in greater detail below, and operation proceeds to step S514.

If, in step S514, it is determined that the one or more NNMA image digests have been generated for each image in the repository, that a 30% cropped image has been generated and stored for each image in the repository, that the one or more NNMA image digests have been generated and stored for each 30% cropped image, and that a distance between the corresponding NNMA image digests for each image in the repository and the NNMA image digest corresponding to the 30% cropped image has been generated and stored, operation proceeds to step S516, otherwise, operation proceeds to step S504.

In step S516, two images are selected at random from the image repository, and operation proceeds to step S518.

In step S518, a distance between the corresponding one or more NNMA image digests of each of the two randomly selected images is generated and stored, and operation proceeds to step S520.

If, in step S520, the number of random image pairs for which one or more distance values have been generated is greater than or equal to the number of original images in the image repository, operation proceeds to step S522, otherwise, operation returns to step S516.

In step S522, the distance values generated in step 512 are evaluated to determine an appropriate search threshold value for each of the one or more image digests generated for each image. If a search threshold is selected for one of the one or more image digests that is greater than all the distance values determined for that image digest in step S512, the likelihood of missing a valid related image, based on a comparison of images based on a comparison of that image digest alone, is zero. However, if the threshold selected is lower than one or more distance values determined in step S512 for the corresponding image digest, there is a possibility that a search based on that image digest may fail to identify an image in the image repository that is related to a selected search image. For example, a measure of the likelihood of a digest based search missing a valid related image based on a comparison of a single image digest may be determined by dividing the number of distance values determined in step 512 for the corresponding image digest that exceed a selected threshold by the total number images in the repository. Once a measure of a likelihood of a miss is determined for each respective image digest, operation proceeds to step S524.

In step S524, the distance values determined in step S518 may be evaluated to determine the likelihood of a digest based image search based on a comparison of a selected image digest misidentifying an image as related to a search image when, in fact it is not a related image. For example, if a threshold is selected for an image digest that is lower than all the distance values determined in step S518, the likelihood of false alarm is zero. However, if the threshold selected for the image digest is greater than one or more distance values determined in step S518, there is a possibility that a search result based on the single image digest may incorrectly identify an image in the image repository that is not related to a selected search image. For example, a measure of the likelihood of an image digest based search incorrectly returning an image may be determined by dividing the number of distance values determined in step S518 that are below a selected threshold by the total number images in the repository. Once a measure of a likelihood of a false return is determined, operation proceeds to step S526.

In step S526, a user may be notified of a determined measure of a likelihood of a miss and a determined measure of a likelihood of a false return for a set of one or more automatically selected search thresholds determined for one or more generated image digests. The user may be provided an opportunity to manually adjust the search thresholds for each of the respective image digests, and/or to increase or decrease a number of image digests to be used in a search, and/or to provide an acceptable upper bound for the probability of misses, and an acceptable upper bound for the probability of false alarms. In this manner, an exemplary NNMA image digest processing device 100 may automatically adjust a number of image digests used and the corresponding search thresholds to accommodate a user's indicated upper bound values. Once an acceptable set of image digests and corresponding search threshold values is determine for use in subsequent digest based image searches, operation proceeds to step S528, and the process terminates.

The probability of a miss or a false alarm for a single image digest may be determined as indicated below. For example, let $v(I)$ denote the image digest vector extracted from the image I. Also, let I' denote a cropped version of I and let J denote an altogether different image from I, It is desired that, $$Pr(\|v(I)-v(I')\|<\tau) > 1-\mu_1 \qquad \text{EQN. 1}$$

and $$Pr(\|v(I)-v(I')\|<\tau) > 1-\mu_1 \qquad \text{EQN. 2}$$

where $0<\mu_1, \mu_2<1$ and the goal is to make them as close to 0 as possible. Therefore to evaluate the statistical performance of the image digest, we may define $$\text{Probability of miss: } P_M(\tau) = Pr(\|v(I)-v(I')\|>\tau) \qquad \text{EQN. 3}$$

$$\text{Probability of false alarm: } P_F(\tau) = Pr(\|v(I)-v(J)\|<\tau) \qquad \text{EQN. 4}$$

Note the probabilities above are defined by conducting tests over a large number of images. In the test results discussed in greater detail below with respect to FIG. 20 and FIG. 21, image digests were obtained from one-hundred different images in a repository. For each image, two distorted versions were created by: (a) 30% cropping symmetrically along the vertical and horizontal directions, and (b) 50% cropping from the side. Cropping is described in greater detail below with respect to FIGS. 17-19.

Figure 6:
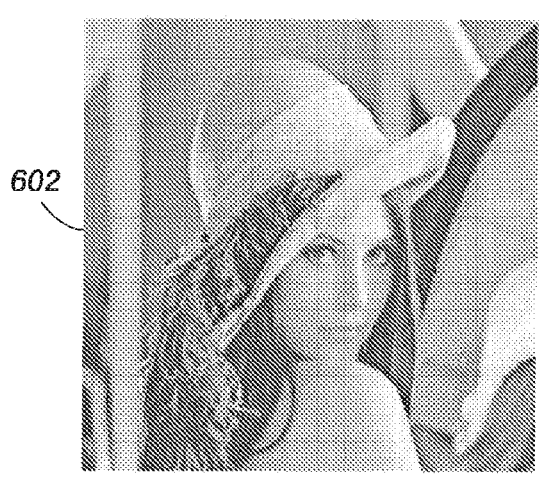
FIGS. 6, 7 and 8 are examples of related images, including an original image, a cropped version of the original image and a cropped, rotated and resized version of the original image, respectively.
Figure 7:
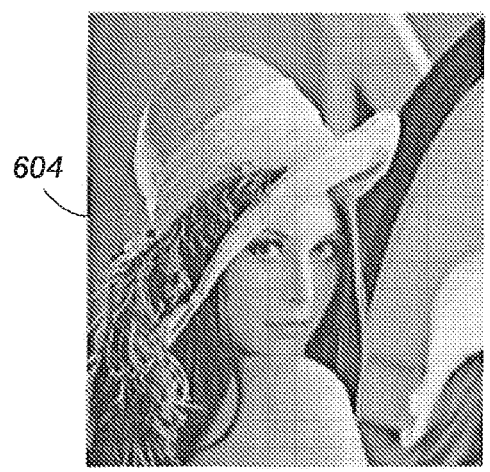
Figure 8:

FIGS. 6, 7 and 8 are examples of related images. FIG. 6 is an original, unmodified image. FIG. 7 is a copy of FIG. 6 in which a portion of the image along the left side has been cropped. FIG. 8 is a copy of FIG. 6 that has been rotated to the right, then cropped on all four sides, and then resized, thereby affecting the contrast of the image, throughout.

As addressed in greater detail, below, cropping, rotation, and changes in brightness and/or contrast may all be modeled as distortions in a frequency-based representation of an image. However, an NNMA image digest generated in a manner similar to that described above with respect to FIG. 3, is robust to such distortions. Therefore, such distortions may be applied to a photograph without significantly altering its respective NNMA image digest.

For this reason, an NNMA image digest generated for an original image may sufficiently match the NNMA image digest generated for a distorted version of the original image. Therefore, related images, i.e., original and/or distorted versions of the original image, may be identified by their respective NNMA image digests. In other words, if two NNMA image digests are sufficiently close to one another, the two images associated with the respective NNMA image digests are likely variations of the same image.

Figure 9:
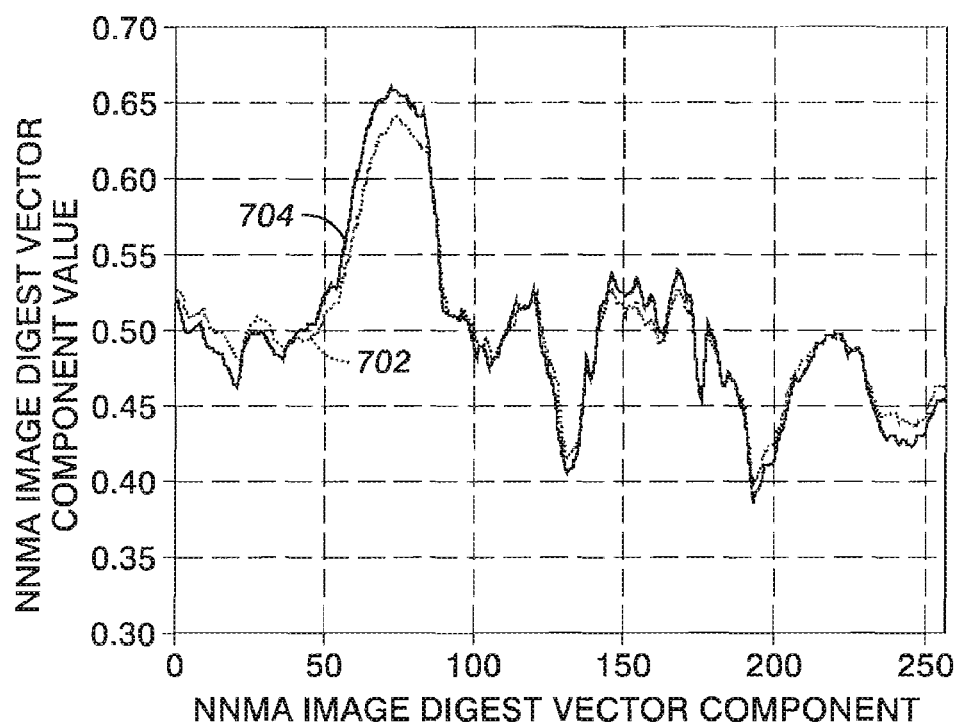
FIG. 9 compares a plot of an exemplary NNMA image digest corresponding to the original image presented in FIG. 6 with an exemplary NNMA image digest corresponding to the cropped image presented in FIG. 7.

FIG. 9 compares a plot 702 of an exemplary NNMA image digest corresponding to the original image presented in FIG. 6 with a plot 706 of an exemplary NNMA image digest corresponding to cropped and resized image presented in FIG. 7. As demonstrated in FIG, 9, the NNMA image digest of plot 702 remains very similar to the NNMA image digest of plot 706, despite cropping and resizing of the original image.

Figure 10:
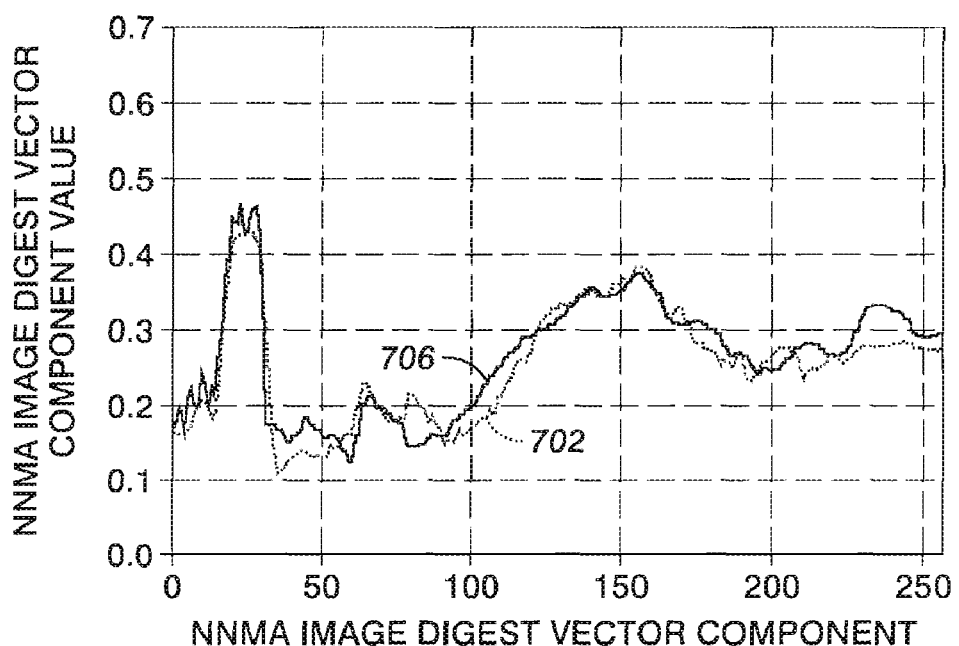
FIG. 10 compares a plot of an exemplary NNMA image digest corresponding to the original image presented in FIG. 6 with an exemplary NNMA image digest corresponding to the cropped, rotated and resized image presented in FIG. 8.

FIG. 10 compares a plot 702 of an exemplary NNMA image digest corresponding to the original image presented in FIG. 6 with a plot 706 of an exemplary NNMA image digest corresponding to the rotated, cropped and resized image presented in FIG. 8. As demonstrated in FIG. 10, the NNMA image digest of plot 702 remains very similar to the NNMA image digest of plot 706, despite the rotation, cropping and resizing of the original image.

Figure 11:
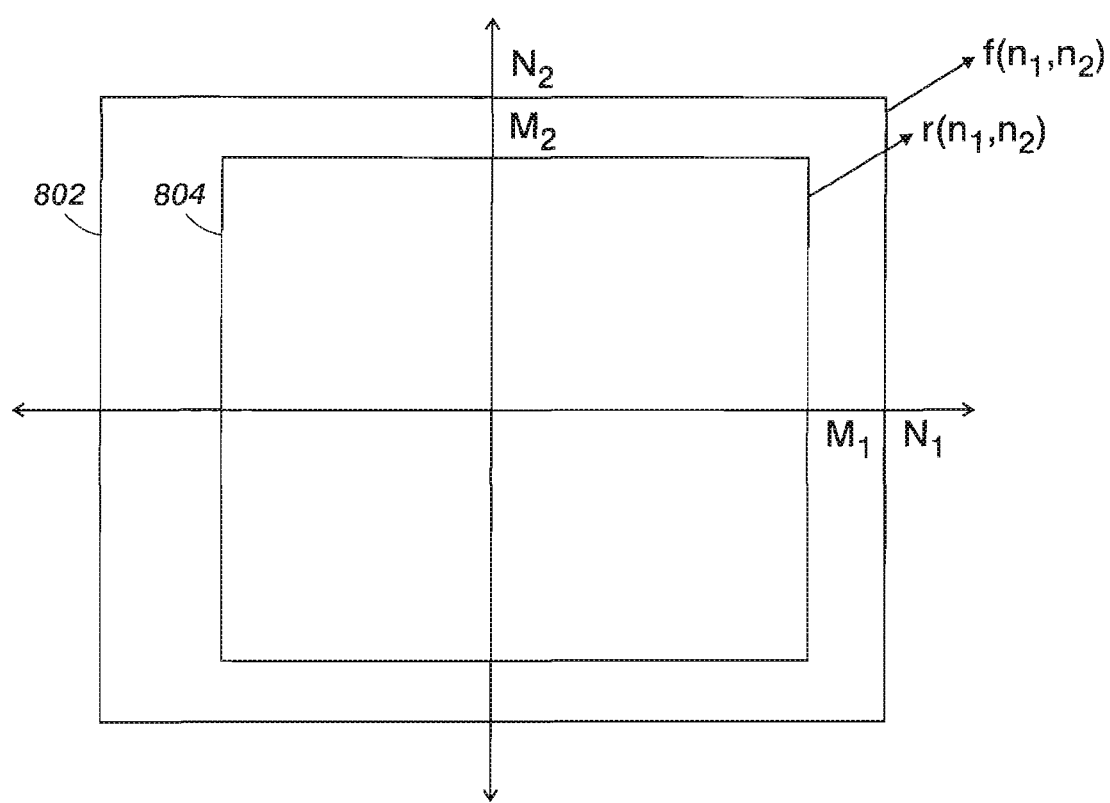
FIG. 11 is a plot of an exemplary 2-dimentional coordinate plane that depicts cropping as multiplication by a mask in the spatial domain.

FIG. 11 is a plot of an exemplary 2-dimentional coordinate plane that depicts cropping as multiplication by a mask in the spatial domain.

For example, consider an image f(n1, n2), shown at 802 in FIG, 11, with N1 rows and N2 columns, so that it is defined over the domain Ω={0, 1, 2, . . . ,N1-1}×{0, 1, 2, . . . ,N2-1}. As demonstrated in FIG. 11, cropping of the image may be thought of as a multiplication with a masking window, shown at 804 in FIG. 11. Assuming that the image is cropped to new dimensions of M1×M2 (with M1≦N1, and M2≦N2), the masking window r(n1, n2), also defined over Ω, may be written as, $$r(n_1, n_2) = \begin{bmatrix} 1 & \text{if } M_{1a} \leq n_1 \leq M_{1b} \text{ and } M_{2a} \leq n_2 \leq M_{2b} \\ 0 & \text{otherwise} \end{bmatrix} \quad \text{EQN. 5}$$

Note that M1*a* and M1*b* define the top and bottom cropping locations respectively, so that M1=M1*b*−M1*a*.

Likewise, M2=M2*b*−M2*a*. We can now define the cropped image c(n1, n2) as, $$c(n_1, n_2) = f(n_1, n_2) \times r(n_1, n_2) \; \forall (n_1, n_2) \in \Omega \quad \text{EQN. 6}$$

The effect of cropping in the spatial domain is illustrated in FIG. 11. This in turn is equivalent to circular convolution in the DFT domain. Defining F(k1, k2), R(k1, k2), and C(k1, k2) as the 2D DFT of f(n1, n2), r(n1, n2), and c(n1, n2) respectively, the circular convolution can be written as, $$C(k_1, k_2) = \sum_{l_1=0}^{N_1-1} \sum_{l_2=0}^{N_2-1} F(l_1, l_2) R(\langle k_1 - l_1 \rangle_{N_1} \langle k_2 - l_2 \rangle_{N_2}) \quad \text{EQN. 7}$$

where $\langle \rangle_N$ denotes the modulo N operator

The DFT R(k1, k2) of the masking window r(n1, n2) would be a sinc-like function, with its shape being a function of M1 and M2, and a phase shift that depends on the location of the masking window, i.e., M1*a* and M2*a*. An exemplary plot of the sine function is shown in FIG. 12.

Figure 12:
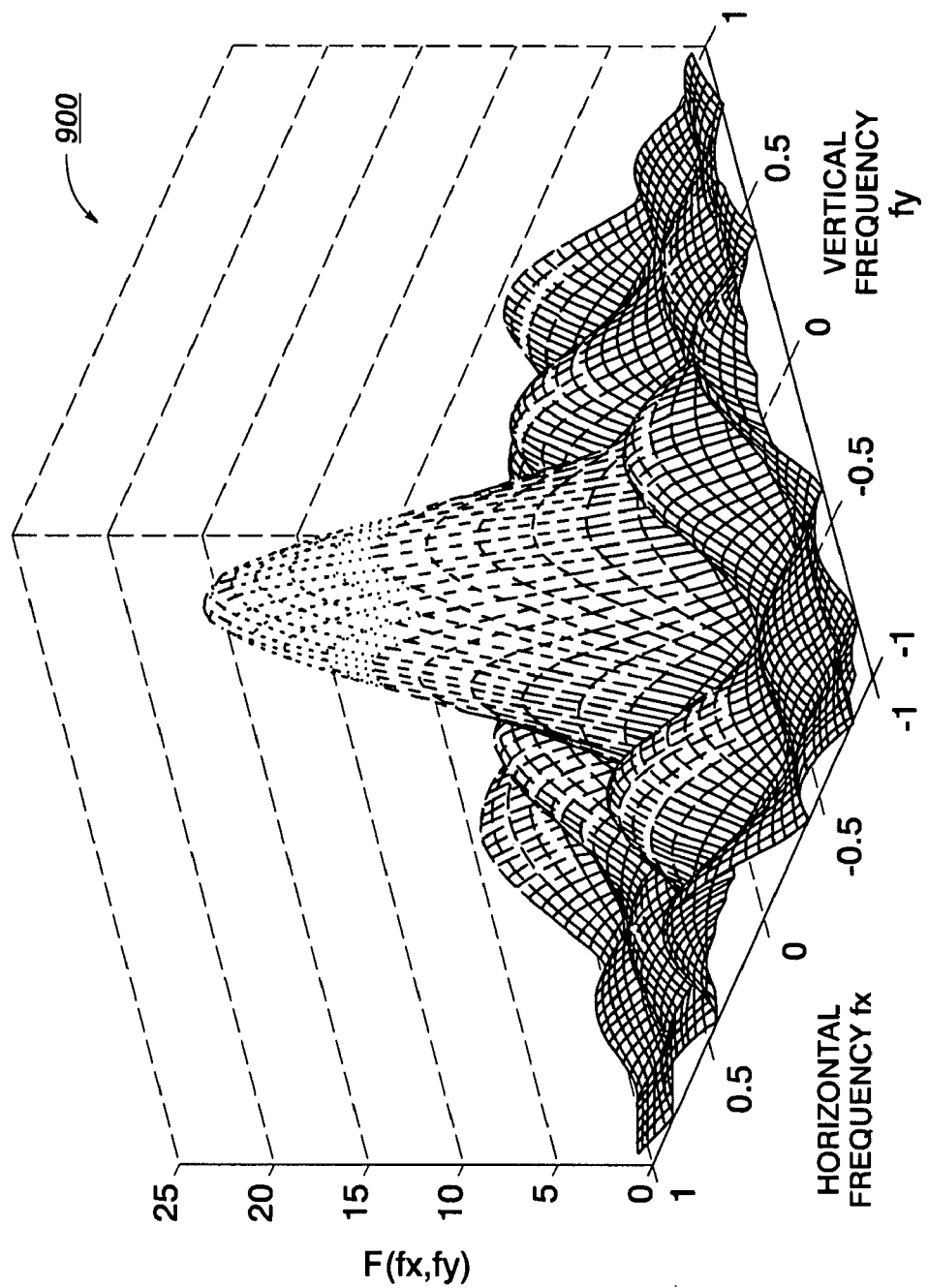
FIG. 12 is 3-dimensional plot of an exemplary frequency-based representation of a digital image.

FIG. 12 is 3-dimensional plot 900 of an exemplary frequency-based representation of a digital image. When the cropping is mild, N1-M1 and N2-M2 are small, and the sinc-like function would be quite narrow—almost a delta function in the frequency domain. For mild cropping, most of the energy of R(k1, k2) is concentrated on the {0, 0} coefficient, along with low frequency part of the first row and first column. Thus, the blurring of the original image spectrum will be mild for those discrete Fourier transform (DFT) coefficients whose magnitude is high or of the same order as its neighbors. However, for coefficients whose magnitude is significantly lower than its neighbors, the blurring will cause its magnitude to increase. Another interesting aspect of cropping is that unlike other perceptually insignificant distortions like JPEG compression, cropping contributes to distortions in all the frequency bands low, mid and high. In fact, from the expression in Eqn. 7 it may be inferred that as the extent of cropping increases, the DC component and more generally "very low" DFT coefficients are quite significantly modified. It is easy to see that the DC component or the average intensity of the image is likely to change significantly as the image is cropped.

Hence, to maintain robustness to cropping it is advisable to keep low-mid frequency DFT coefficients. In the model of cropping presented above, the mask window may be defined in very many ways. The above example considers only an instance of cropping in the expressions provided. However, the qualitative observations made on the magnitude of DFT coefficients would still hold true because different mask windows are simply translations of each other which only causes a change in the phase response of the DFT but leaving the magnitude response the same.

Figure 13:
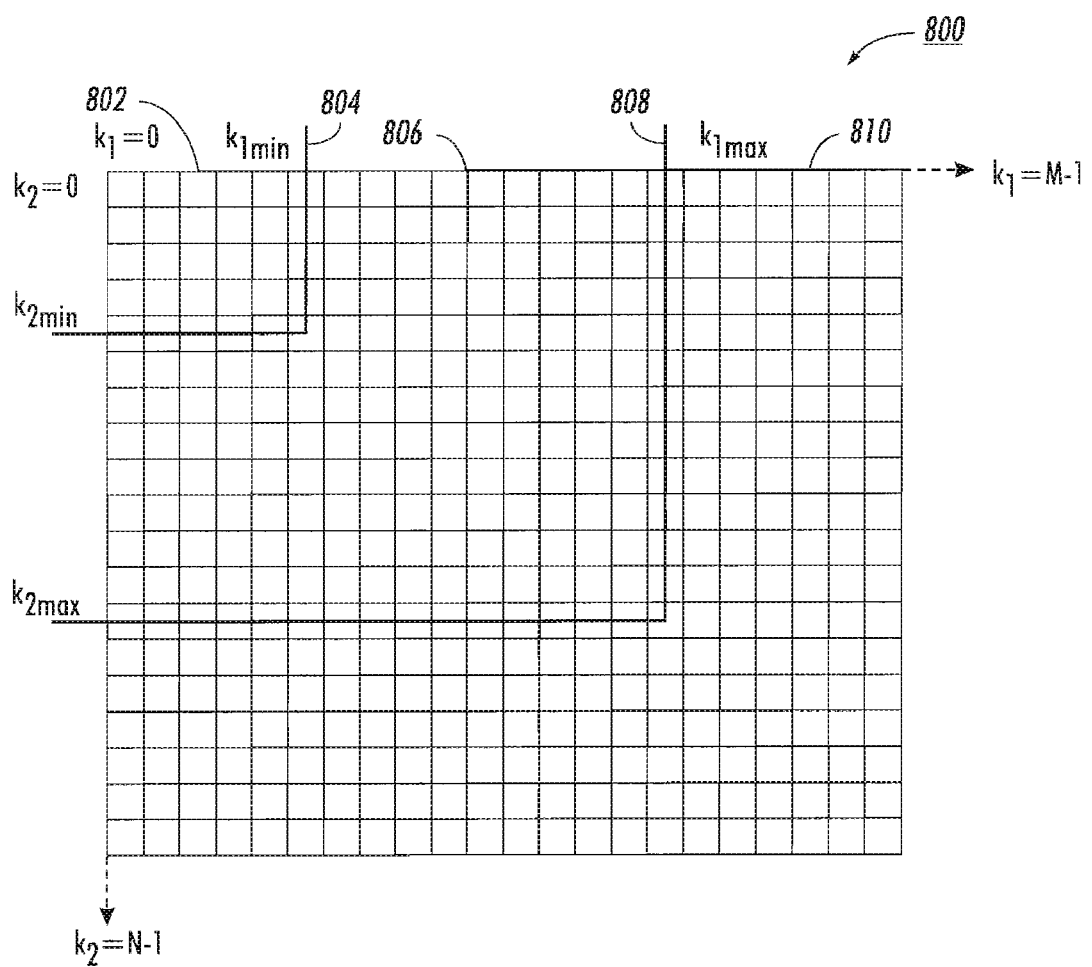
FIG. 13 is a graphical representation of a process for extracting discrete Fourier transform (DFT) coefficients from a frequency-based 2-dimentional matrix representation of a digital image.

FIG. 13 is a graphical representation 800 of the process of extracting significant discrete Fourier transform (DFT) coefficients from a frequency-based 2-dimentional matrix representation of a digital image.

As shown in FIG. 13, the significant coefficients correspond to coefficients associated with values in the L-shaped section 806 of the frequency-based matrix, between lines 804 and 808. Coefficients associated with the L-shaped section 810 of the frequency-based matrix are discarded, and coefficients associated with the rectangular section 802 of the frequency-based matrix are discarded. Therefore, the significant coefficients that are retained may be defined as the magnitude of all Fourier coefficients corresponding to indices (k1, k2) such that:

$$k_{1\,min} \leq k_1 \leq k_{1\,max} \text{ and } k_{2\,min} \leq k_2 \leq k_{2\,max}$$

$$\text{such that } 0 \leq k_{1\,min}, k_1, k_{1\,max} \leq M-1 \quad \text{EQN. 8}$$

$$\text{and } 0 \leq k_{2\,min}, k_2, k_{2\,max} \leq N-1$$

The described approach involves several stages. Performing NNMAs on FFT coefficients as opposed to the spatial domain significantly improved the performance of the image digest in the sense of its robustness to cropping and pixel translation. The effect of cropping approximately manifests as noise on the magnitude of the FFT coefficients which is further diminished/canceled as a result of the dimensionality reduction via NNMA. The next stage retains only a small subset of the relevant FFT coefficients providing necessary reduction in size. If NNMA were to be performed directly on the complete image, the processing required to produce an image digest would be increased and the resulting image digest would be longer.

A measure of distance, Dφ, between two NNMA digests produced in such a manner as described above may be defined as a Bregman distance corresponding to the convex function φ(x)=−log(x), i.e. Dφ may be defined as:

$$D_\varphi(x, y) = \frac{x}{y} - \log\frac{x}{y} - 1 \quad \text{EQN. 9}$$

The aforementioned distance has been experimentally found to yield robust image digests under cropping. In that sense, the above measure of distance is "matched" to the distortions caused by cropping on the DFT coefficients. Experimental results deteriorated significantly if a "non-matching" distance measure was used.

Control parameters in the algorithm, e.g., the range of the frequency coefficients and the rank r of the approximation, help facilitate trade-offs between robustness under cropping and fragility to visually distinct inputs. For instance, increasing the rank of the approximation would mean better discriminability under visually distinct inputs but would also make the image digest less robust.

For all the results presented below, 256×256 original images were used. Cropped images were re-sized to the same size using bi-cubic interpolation before processing through the image digest algorithm. Then, 32×32 modified images were retained after stage 1, and finally rank r=1 approximations were used resulting in image digests of length 64.

Figure 14:
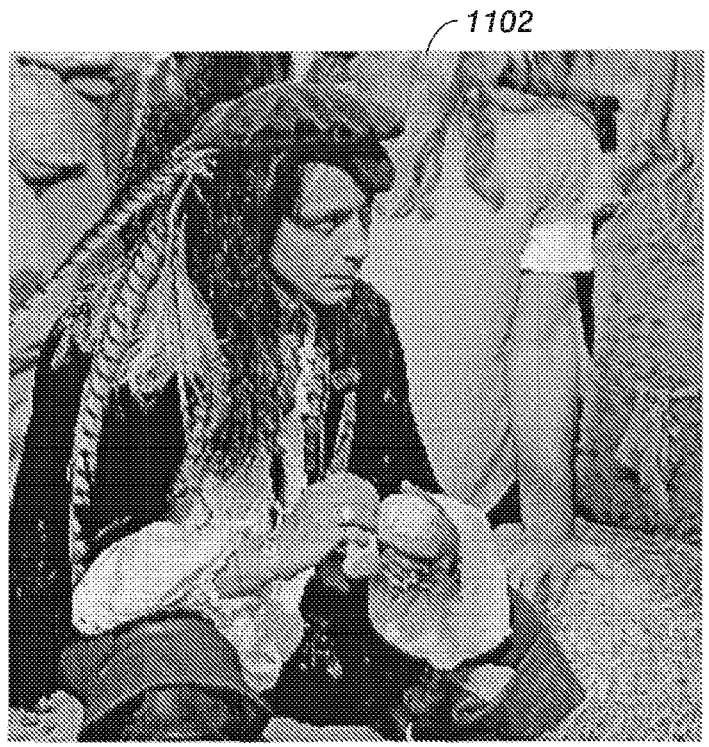
FIG. 14 is an example of an image that is not related to any of the images presented in FIGS. 6-8.

FIG. 14 is an example of an image that is not related to any of the images presented in FIGS. 6-8.

Figure 15:
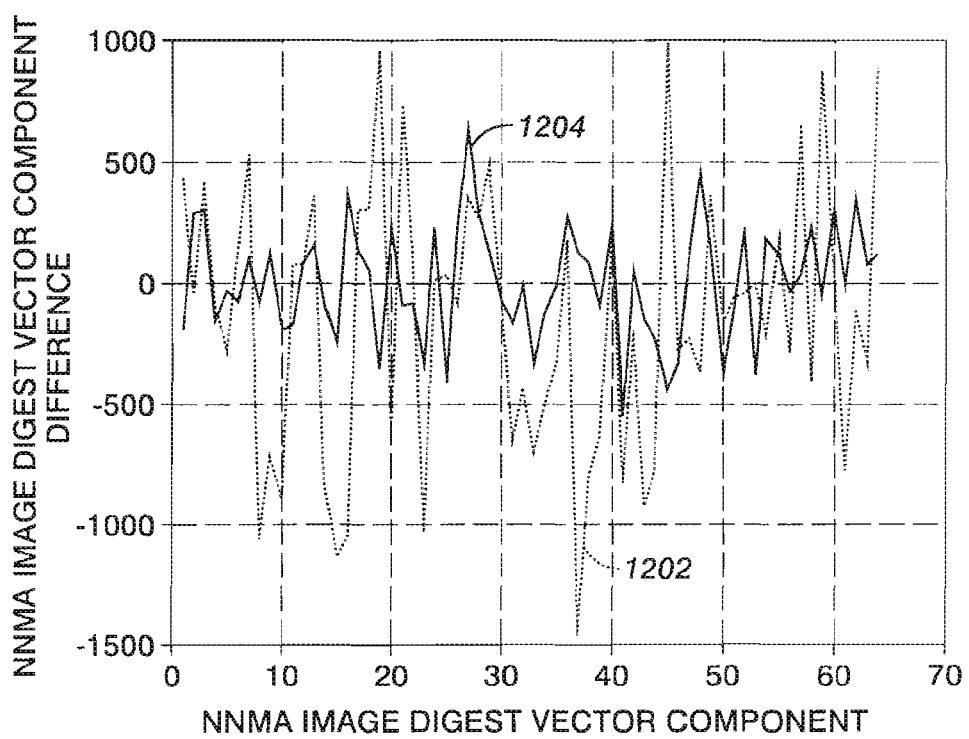
FIG. 15 compares a first plot of component-wise differences between an exemplary NNMA image digest vector generated for the image presented in FIG. 6 and an exemplary NNMA image digest vector generated for the image presented in FIG. 14, with a second plot of component-wise differences between an exemplary NNMA image digest vector generated for the original image presented in FIG. 6 and the NNMA image digest vector generated for the exemplary cropped version of the original image presented in FIG. 7.

FIG. 15 compares a first plot 1202 of component-wise differences between an exemplary NNMA image digest vector generated for the image presented in FIG. 6 and an exemplary NNMA image digest vector generated for the image presented in FIG. 14, with a second plot 1204 of component-wise differences between an exemplary NNMA image digest vector generated for the original image presented in FIG. 6 and the NNMA image digest vector generated for the exemplary cropped version of the original image presented in FIG. 7.

Figure 16:
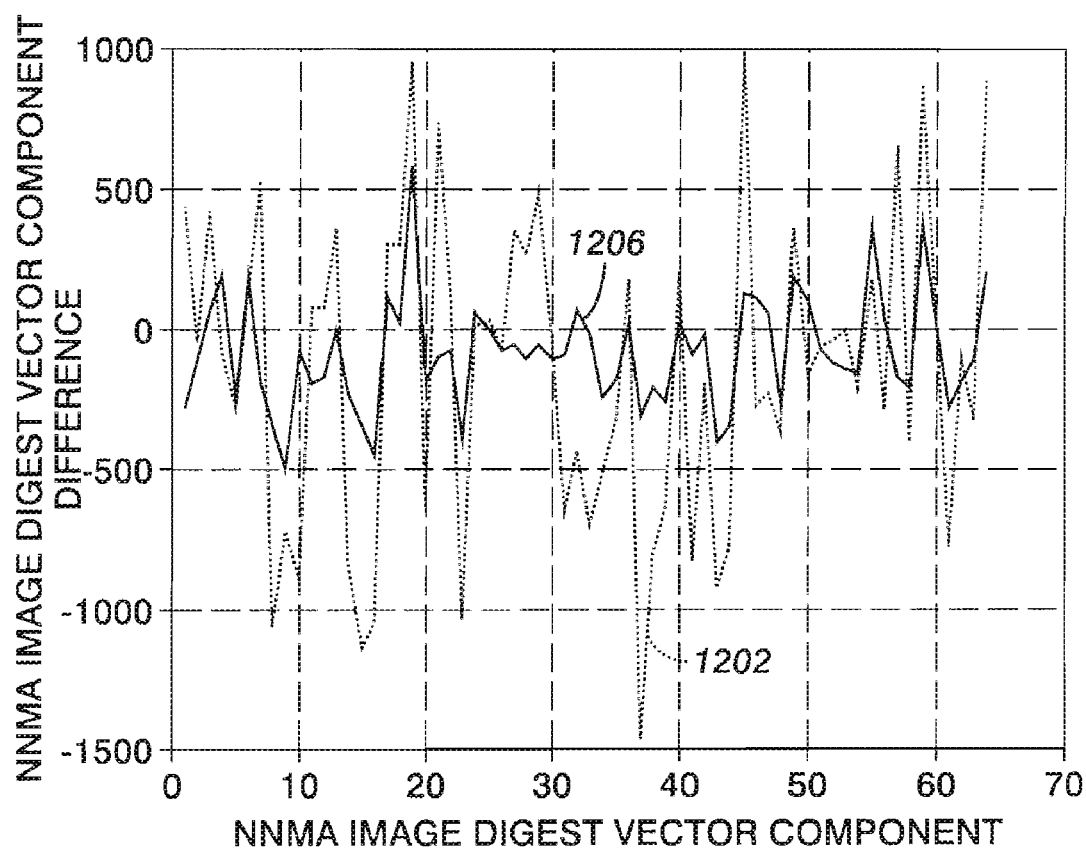
FIG. 16 compares a first plot of component-wise differences between an exemplary NNMA image digest vector generated for the image presented in FIG. 6 and an exemplary NNMA image digest vector generated for the image presented in FIG. 14, with a second plot of component-wise differences between an exemplary NNMA image digest vector generated for the original image presented in FIG. 6 and the NNMA image digest vector generated for the exemplary cropped, rotated and resized version of the original image presented in FIG. 8.

FIG. 16 compares a plot 1202 of component-wise differences between an exemplary NNMA image digest vector generated for the image presented in FIG. 6 and an exemplary NNMA image digest vector generated for the image presented in FIG. 14, with a plot of component-wise differences between an exemplary NNMA image digest vector generated for the original image presented in FIG. 6 and the NNMA image digest vector generated for the exemplary cropped, rotated and resized version of the original image presented in FIG. 8.

As demonstrated in FIG. 15, the magnitude of the differences, plotted at 1202, between the two unrelated images, i.e., the differences between image 602 of FIG. 6 and image 1102 of FIG. 14, is greater than the magnitude of the differences plotted in FIG. 15 at 1204 between the related images, i.e., the differences between image 602 of FIG. 6 and image 604 of FIG. 7, despite the distortions included in image 604.

As demonstrated in FIG. 16, the magnitude of the differences, plotted at 1202, between the two unrelated images, i.e., the differences between image 602 of FIG. 6 and image 1102 of FIG. 14, is greater than the magnitude of the differences plotted in FIG. 16 at 1206 between the related images, i.e., the differences between image 602 of FIG. 6 and image 606 of FIG. 8, despite the distortions included in image 606.

Figure 17:
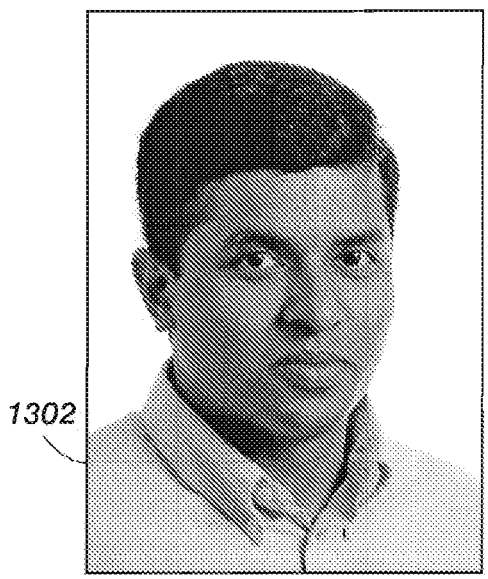
FIGS. 17, 18 and 19 are examples of related images, including an original image, a 30% cropped version of the original image and a 50% cropped version of the original image, respectively.
Figure 18:
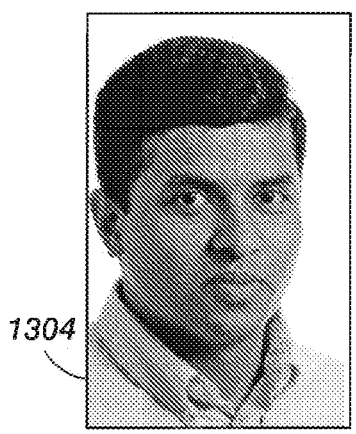
Figure 19:
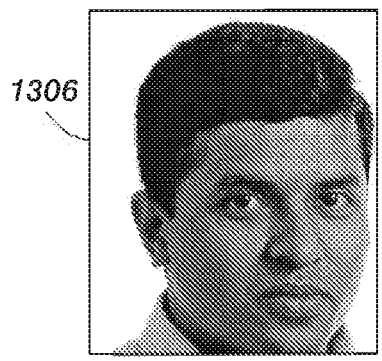
Figure 20:
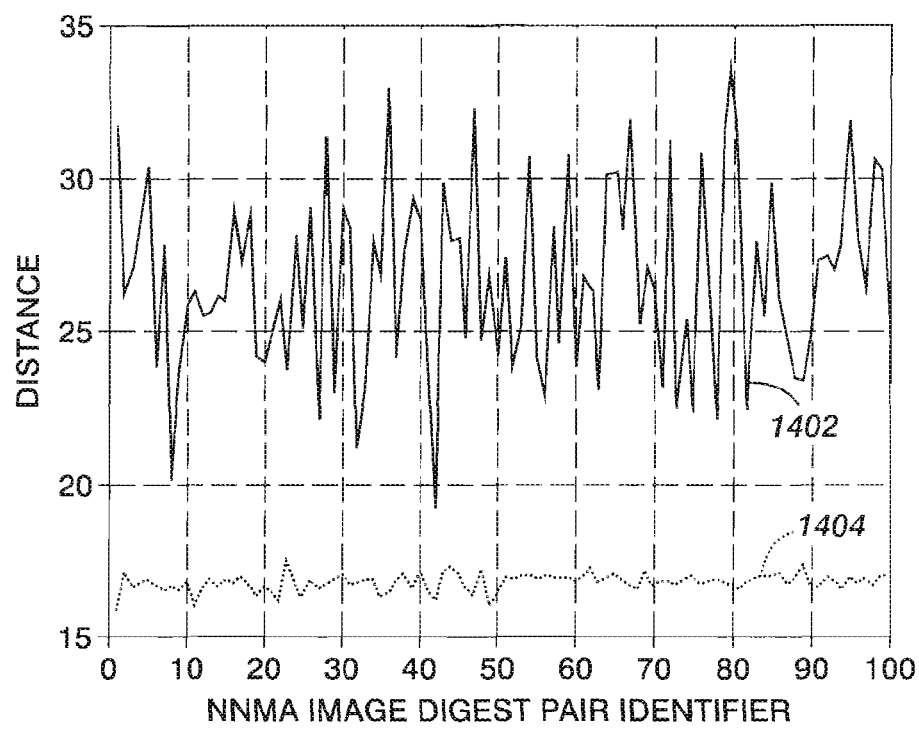
FIG. 20 compares a first plot in which each of one-hundred plotted point represents a distance between the NNMA image digests associated with each image of a pair of images randomly selected from an image repository, with a second plot in which each of one-hundred plotted points represents a distance between the NNMA image digests associated with each image in a pair of images that includes an original image and a 30% cropped version of the original image.

FIGS. 17, 18 and 19 are examples of related images, including an original image 1302, a 30% cropped version of the original image 1304 and a 50% cropped version of the original image 1306, respectively;

FIG. 20 compares a plot 1402 in which each of one-hundred plotted point represents a distance between the NNMA image digests associated with each image in a pair of images randomly selected from an image repository, with a plot 1404 in which each of one-hundred plotted point represents a distance between the NNMA image digests associated with each image in a pair of images that includes an original image and a 30% cropped version of the original image.

Figure 21:
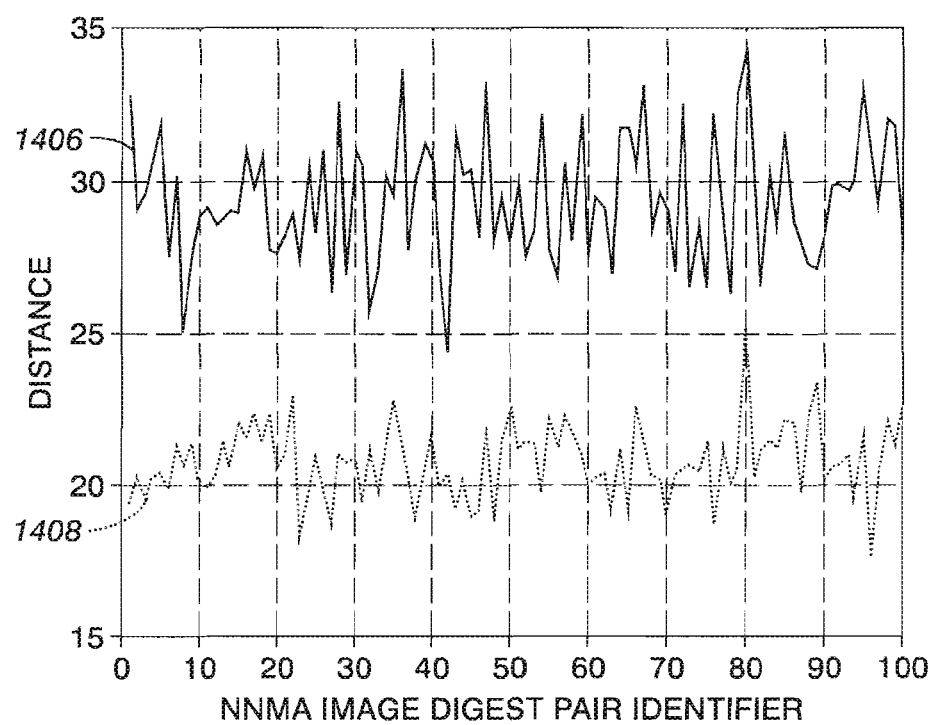
FIG. 21 compares a first plot in which each of one-hundred plotted points represents a distance between the NNMA image digests associated with each image in a pair of images randomly selected from an image repository, with a second plot in which each of one-hundred plotted points represents a distance between the NNMA image digests associated with each image in a pair of images that includes an original image and a 50% cropped version of the original image.

FIG. 21 compares a plot 1406 in which each of one-hundred plotted point represents a distance between the NNMA image digests associated with each image in a pair of images randomly selected from an image repository, with a plot 1408 in which each of one-hundred plotted point represents a distance between the NNMA image digests associated with each image in a pair of images that includes an original image and a 50% cropped version of the original image; and As described above with respect to FIG. 5, and as demonstrated in FIGS. 20, and 21, if a threshold is selected that is greater than all the distance values determined in step S512, of FIG. 5, the likelihood of missing a valid related image is zero. However, if the threshold selected is lower than one or more distance values determined in step S512, of FIG. 5, the likelihood of missing a valid related image may be determined, for example, as the percentage of the number of distance values over the selected threshold relative to the total number images in the repository.

Further, as described above with respect to FIG. 5, and as demonstrated in FIGS. 20, and 21, if a threshold is selected that is lower than all the distance values determined in step S518, the likelihood of false alarm is zero. However, if the threshold selected is greater than one or more distance values determined in step S518, the likelihood of a false alarm may be determined, for example, as the percentage of the number of distance values generated in step S518 below the selected threshold relative to the total number images in the repository.

With respect to determining an appropriate nonnegative matrix approximation of reduced coefficient matrix $IF_F$ in step S312, of FIG. 3, described above, given a nonnegative matrix A as input, the classical NNMA problem is to approximate it by a lower rank non-negative matrix of the form BC, where B and C are themselves nonnegative matrices such that $$A_{M \times N} \approx B_{M \times K} C_{K \times N}, \text{ where } B, C \geq 0 \qquad \text{EQN. 10}$$

or equivalently, the columns $\{a_j\}$ j=1, 2, . . . ,N are approximated such that $$a_j \approx B.c_j, \text{ where } a_j \epsilon R^M \text{ and } c_j \epsilon R^K \qquad \text{EQN. 11}$$

For the class of full (nonsparse) matrices, this provides a reduction in storage whenever the number of vectors K, in the basis W is chosen such that K<MN/(M+N). In practice, K is selected so that K<<(M,N). For exemplary formal approaches for choosing a good K, see I. S. Dhillon and S. Sra, Generalized Non-negative Matrix Approximations with Bregman Divergences, *UTCS Technical Report #TR-xx-05*, June 2005.

As described in the above referenced article by I. S. Dhillon and S. Sra, the goodness of the approximation is quantified by using a general class of distortion measures called Bregman divergences. For any strictly convex function $\phi: S \subseteq R \rightarrow R$ that has a continuous first derivative, the corresponding Bregman divergence $D\phi: S \times int(S) \rightarrow R^+$ is defined as $$D_\phi(x,y) = \phi(x) - \phi(y) - \nabla \phi(y)(x-y) \qquad \text{EQN. 12}$$

where int(S) is the interior of set S.

Bregman divergences are nonnegative, convex in the first argument and zero, if and only if, x=y. These divergences play an important role in convex optimization. For example, see Y. Censor and S. A. Zenios. *Parallel Optimization: Theory, Algorithms, and Applications*. Numerical Mathematics and Scientific Computation. Oxford University Press, 1997. Bregman divergences on equal size matrices X and Y may then be defined as $$D_\varphi(X, Y) = \sum_{i,j} D_\varphi(x_{ij}, y_{ij}) \text{ where } x_{ij}, y_{ij} \in \text{domain}(\varphi) \cap R^+ \qquad \text{EQN. 13}$$

And the resulting generalized nonnegative matrix approximation problems are:

$$(B^*, C^*) = \arg\min_{B,C} D_\varphi(A, BC) \qquad \text{EQN. 14}$$

An important concern for constructing image digests is the availability of fast algorithms to obtain such low-rank approximations for a desired K.

While iterative gradient methods could be used to solve for B* and C*, such schemes would invariably be too slow. In 2005, Sra and Dhillon proposed fast algorithms for obtaining matrices B* and C*. See I. S. Dhillon and S. Sra, Generalized Non-negative Matrix Approximations with Bregman Divergences, *UTCS Technical Report #TR-xx-05*, June 2005.

We may re-write the matrix approximation as:

$$[a_1, a_2, \ldots, a_N] \approx \begin{bmatrix} b_1 \\ b_2 \\ \\ b_M \end{bmatrix} [c_1, c_2, \ldots, c_N] \quad \text{EQN. 15}$$

where $a_i \in R^M$, $b_i \in R^K$, $c_i \in R^K$

The work of Y. Censor and S. A. Zenios may be summarized by the following theorem. Theorem: The Bregman-distance Dφ (A, BC) is non-increasing under the following update rules $$c_{j+1} \leftarrow c_j, \psi^{-1}\left(\frac{[B^T\psi(a)]_j}{[B^T\psi(Bc)]_j}\right) \quad \text{EQN. 16}$$

$$b_{j+1} \leftarrow b_j, \psi^{-1}\left(\frac{[\psi(a^T)C^T]_j}{[\psi(b^T C)C^T]_j}\right) \quad \text{EQN. 17}$$

where $\psi = \nabla\varphi$

Proof of this theorem may be found in the article by Sra and Dhillon referenced above. The updates to the rows of B and the columns of C are multiplicative and the multiplicative factor is unity when A=BC so that perfect reconstruction is achieved.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An image digest processing device, comprising:
   a transformation unit that generates a frequency-based representation of a received image;
   an approximation unit that generates a nonnegative matrix approximation of the frequency-based representation of the received image;
   a digest unit that generates an image digest based on the nonnegative matrix approximation of the frequency-based representation of the received image;
   an image repository that includes a plurality of image digests, one or more of the plurality of image digests stored in association with a separate one of a plurality of images stored in the image repository from which each of the respective image digests was generated;
   a search unit that performs a search of the image repository based on one or more image digests generated for the received image;
   wherein the search unit determines a distance between the one or more generated image digests and one or more image digests associated with an image in the image repository and identifies the image in the image repository in a search report if a distance is less than a predetermined threshold value;
   a threshold determining unit that determines a predetermined threshold value used by the search unit;
   wherein the threshold determining unit determines the predetermined threshold value based on an analysis of an image repository to be searched;
   wherein analysis of an image repository to be searched includes determining a probability of false returns and a probability of misses associated with the predetermined threshold value; and
   notifying a user of the probability of misses and the probability of false returns, and prompting the user to manually set an upper bound for the probability of misses and upper bound for the probability of false alarms.

2. The image digest processing device of claim 1, further comprising:
   a reduction unit that reduces a number of coefficients in the frequency-based representation of the received image prior to the approximation unit generating the nonnegative matrix approximation.

3. The image digest processing device of claim 1,
   wherein the received image is a M×N 2-dimensional matrix of spatial image pixel values, and the frequency-based representation of the received image is an M×N 2-dimentional matrix of coefficients of the frequency-based representation of the received image.

4. The image digest processing device of claim 3,
   wherein the transformation unit applies a discrete Fourier transformation to the M×N 2-dimensional matrix of spatial image pixel values to produce the frequency-based representation of the received image.

5. The image digest processing device of claim 2,
   wherein the reduction unit removes a set of high frequency coefficients and a set of low frequency coefficients from a M×N 2-dimentional matrix of coefficients of the frequency-based representation.

6. A method of searching an image repository for images related to a search image, the method, comprising:
   for each of a plurality of images stored in an image repository:
      generating a frequency-based representation of each of the plurality of images in the image repository;
      generating a nonnegative matrix approximation of each of the plurality of frequency-based representations of the images in the image repository; and
      generating an image digest based on the nonnegative matrix approximation of each of the frequency-based representations of the images in the image repository;
      storing each generated image digest in association with the image in the image repository from which the image digest was generated;
   selecting an image from the image repository as a search image;
   searching the image repository for images related to the search image by comparing the image digest associated with the search image with the image digests stored in association with each of the plurality of images in the image repository;
   determining a distance between the image digest of the search image and a digest associated with an image in the repository and identifying the image in the image repository in a search report if the determined distance is less than a predetermined threshold; and
   determining the predetermined threshold value based on an analysis of the image repository;
   wherein analysis of the image repository includes determining a probability of false returns and a probability of misses associated with a predetermined threshold value; and notifying a user of the probability of misses and the probability of false returns, and prompting the user to manually set an upper bound for the probability of misses and upper bound for the probability of false alarms.

7. The method of claim 6, wherein generating an image digest for each of the images in the image repository further comprises:

reducing a number of coefficients in the frequency-based representation of each of the plurality of images in the image repository prior to generating the nonnegative matrix approximation.

8. The method of claim 7, wherein reducing the number of coefficients includes removing a set of high frequency coefficients and removing a set of low frequency coefficients from a M×N 2-dimentional matrix of coefficients of the frequency-based representation of each of the plurality of images in the image repository.

9. The method of claim 6, wherein each of the plurality of images in the image repository is an M×N 2-dimensional matrix of spatial image pixel values, and the frequency-based representation of each of the plurality of images in the image repository is an M×N 2-dimentional matrix of coefficients of a frequency-based representation of the respective images.

10. The digest processing device of claim 9, wherein generating a frequency-based representation of each of the plurality of images in the image repository includes applying a discrete Fourier transformation to the M×N 2-dimensional matrix of spatial image pixel values of each of the plurality of images in the image repository.

* * * * *